United States Patent
Klockner

(10) Patent No.: US 11,205,198 B2
(45) Date of Patent: Dec. 21, 2021

(54) SYSTEMS AND METHODS FOR OUTDOOR ADVERTISING

(71) Applicant: OOH Software LLC, Jupiter, FL (US)

(72) Inventor: Ryan Mark Klockner, Brick, NJ (US)

(73) Assignee: OOH SOFTWARE LLC, Jupiter, FL (US)

(*) Notice: Subject to any disclaimer, the term of this patent is extended or adjusted under 35 U.S.C. 154(b) by 82 days.

(21) Appl. No.: 16/720,657

(22) Filed: Dec. 19, 2019

(65) Prior Publication Data

US 2020/0202392 A1 Jun. 25, 2020

Related U.S. Application Data

(60) Provisional application No. 62/784,024, filed on Dec. 21, 2018.

(51) Int. Cl.
*G06Q 30/02* (2012.01)
*H04L 12/58* (2006.01)

(52) U.S. Cl.
CPC ..... *G06Q 30/0273* (2013.01); *G06Q 30/0267* (2013.01); *G06Q 30/0269* (2013.01);
(Continued)

(58) Field of Classification Search
CPC .................................................... G06Q 30/02
See application file for complete search history.

(56) References Cited

U.S. PATENT DOCUMENTS

2005/0177421 A1* 8/2005 Fujimoto ........... G06Q 30/0247
705/14.46

2015/0019353 A1* 1/2015 Warrum .............. G06F 16/9566
705/14.73
(Continued)

FOREIGN PATENT DOCUMENTS

KR 2008-7025185 A * 10/2008 ............. G06Q 30/00

OTHER PUBLICATIONS

J.V. Harrison; A. Andrusiewicz, An emerging marketplace for digital advertising based on amalgamated digital signage networks (English) EEE International Conference on E-Commerce, 2003. CEC 2003. (pp. 149-156), Jan. 1, 2003 (Year: 2003).*

*Primary Examiner* — Marilyn G Macasiano
(74) *Attorney, Agent, or Firm* — John Maldjian; Stevens & Lee PC

(57) ABSTRACT

A system for advertising is disclosed, the system comprising a communication devices; an advertising mediums for displaying an advertisement; a vendors; an advertising agency; and a computer-readable medium coupled to the communication device having instructions stored thereon which when executed by the communication device, cause the communication device to perform operations. The operations includes, receiving a request for proposal (RFP) from the advertising agency; determining advertising mediums that matches with the RFP; transmitting a RFP notification to the vendors of the determined advertising mediums, wherein each of the vendors receives a distinctive Uniform Resource Locator (URL) within the notification; receiving a response from one of the vendors; generating and transmitting a proposal based on the response received from the vendors to the advertising agency; receiving a selection of the advertising mediums from the advertising agency; and generating a contract for advertising on the selected advertising medium.

23 Claims, 5 Drawing Sheets

(52) U.S. Cl.
CPC ..... *G06Q 30/0276* (2013.01); *G06Q 30/0277* (2013.01); *H04L 51/36* (2013.01)

(56) References Cited

U.S. PATENT DOCUMENTS

2016/0155146 A1* 6/2016 Valentino ........... G06Q 30/0255
  705/14.53
2018/0158107 A1* 6/2018 Wang ................. G06Q 30/0275

* cited by examiner

FIG. 4

SYSTEMS AND METHODS FOR OUTDOOR ADVERTISING

CROSS-REFERENCE TO RELATED APPLICATION

This application claims the benefit of U.S. Provisional Application Ser. No. 62/784,024 filed Dec. 21, 2018, entitled "Systems And Methods For Outdoor Advertising", which is incorporated herein by reference in its entirety.

BACKGROUND

Field of Invention

Embodiments disclosed herein relate, in general, to methods and systems for outdoor advertising and, more particularly, to methods and systems for managing a relationship between an advertising agency and independent advertising medium vendor(s).

Description of Related Art

Over the years, advertising agencies have tried to target their advertisement towards customers who are most likely to be positively influenced by the advertisements. Advertisements may inform potential customers about brands and varieties of products or services available in the market to the customers. The advertising agencies have utilized advertising mediums that uses static advertising image, permanently or semi-permanently affixed to the advertising mediums. One drawback of such advertising mediums is that in order to change the advertisement, the advertisement has to be physically replaced and/or repainted. More recently, advertising mediums such as Out-of-Home (OOH) or Outdoor advertising have been employed and are known as one way to reach to a maximum number of potential customers in a geographical region. Such advertising medium allows the advertisements to be displayed and changed electronically or otherwise. Therefore, advertising agencies are using outdoor advertising mediums such as billboards, hoardings, interiors and exteriors of public transports, and so forth.

Moreover, currently, advertising agencies are facing difficulty in determining where to place the advertisements to reach a specific targeted audience. Over the last years, electronic commerce has become well known. Multiple online platforms are available that allow a costumer to find a product or a service as per their requirements at a listed price and purchase the product or the service online at that price. Further, products and services may be available for auction on the online platforms and costumers may bid on the online platforms. Generally, different criteria may be set according to which the bidding is executed. The online platforms manage the bidding process including transactions, defining a criteria for making and accepting payments, and assuring that products and services are delivered to the customers. Such, electronic enhancements to the traditional auction process allows a customer and a vendor to take part in an auction from anywhere at their convenience. While the customers and the vendors may be represented by third party service providers, the overall control of the auction is performed in a centralized manner. A similar approach has been used in advertising systems for auctioning of different advertising mediums.

However, with the conventional advertising systems, it is difficult to select an advertising medium in order to reach the potential customers. Further, the conventional advertising systems do not enable advertising agencies to simultaneously communicate with multiple vendors at a single platform. In addition, the vendors cannot communicate with the advertising agencies, in case the advertising agencies do not send a request for proposal to the vendors directly.

Thus there is a need for an advertising system and method to manage a relationship between the advertising agencies and the vendors to support an effective and convenient advertising campaign.

SUMMARY

Embodiments in accordance with the present invention provide a system comprising one or more communication devices; one or more advertising mediums for displaying at least one advertisement; one or more vendors of the one or more advertising medium; at least one advertising agency; and a computer-readable medium coupled to the one or more communication devices having instructions stored thereon which when executed by the one or more communication devices, cause the one or more communication devices to perform operations. The operations performed includes, receiving at least one request for proposal (RFP) from the at least one advertising agency; determining one or more advertising mediums that matches with the at least one RFP. Further, the operations performed includes transmitting at least one RFP notification to the one or more vendors of the one or more determined advertising mediums, wherein each of the one or more vendors receives a distinctive Uniform Resource Locator (URL) within the at least one notification. Further, the operations performed includes, receiving at least one response from at least one of the vendors. The operations performed further includes generating at least one proposal based on the at least one response received from at least one of the vendors, wherein the at least one generated proposal is transmitted to the at least one advertising agency. Furthermore, the operations performed includes receiving at least one selection of the at least one advertising medium from the at least one advertising agency, wherein the at least one selected advertising medium is put on hold for a specific period of time. The operations performed includes generating at least one contract for advertising on the at least one of the selected advertising medium.

Embodiments in accordance with the present invention provide a system comprising one or more communication devices; one or more advertising mediums for displaying at least one advertisement; one or more vendors of the one or more advertising medium; at least one advertising agency; and a computer-readable medium coupled to the one or more communication devices having instructions stored thereon which, when executed by the one or more communication devices, cause the one or more communication devices to perform operations. The operations performed includes receiving at least one request for proposal (RFP) from the at least one advertising agency. Further, the operations performed includes determining one or more advertising mediums that matches with the at least one RFP. The operations performed further includes transmitting at least one RFP notification to the one or more vendors of the one or more determined advertising mediums, wherein each of the one or more vendors receives a distinctive Uniform Resource Locator (URL) within the at least one notification, wherein the at least one RFP notification is tracked by determining if a tracking image embedded within the at least one RFP notification is downloaded in the at least one of the communication device. Further, the operations performed includes receiving at least one response from at least one of the vendors, generating at least one proposal based on the at least one response received from at least one of the vendors, wherein the at least one generated proposal is transmitted to the at least one advertising agency. The operations performed further includes receiving at least one selection of the at least one advertising medium from the at least one advertising agency, wherein the at least one selected advertising medium is put on hold for a specific period of time. Further, the operations performed includes generating at least one contract for advertising on the at least one of the selected advertising medium.

Embodiments in accordance with the present invention provide a computer implemented method by at least one communication device, such that the at least one communication device comprises at least one processor and at least one memory having at least one instruction executable by the at least one processor. The method comprising steps of receiving at least one request for proposal from at least one advertising agency; determining one or more advertising mediums that matches with the at least one request for proposal; transmitting at least one RFP notification to one or more vendors of the one or more determined advertising mediums, wherein each of the one or more vendors receives a distinctive Uniform Resource Locator (URL) within the at least one notification, wherein the at least one notification is tracked by determining if a tracking image embedded within the at least one notification is downloaded in the at least one of the communication device; receiving at least one response from at least one of the vendors; generating at least one proposal based on the at least one response received from at least one of the vendors, wherein the at least one generated proposal is transmitted to the at least one advertising agency, receiving at least one selection of the at least one advertising medium from the at least one advertising agency, wherein the at least one selected advertising medium is put on hold for a specific period of time; and generating at least one contract for advertising on the at least one of the selected advertising medium.

Embodiments in accordance with the present invention provide a system for managing a relationship between an advertising agency and an independent vendor(s). The system provides a common platform to both the advertising agencies and the vendors to communicate and proceed for campaigning.

Embodiments in accordance with the present invention further provide an automated system for processing a Request for Proposal (RFP) received from the advertising agencies. Based on the RFP, one or more of the vendors quickly respond about the availability of the advertising mediums.

Embodiments of the present invention may provide a number of advantages depending on its particular configuration. It is an object of the present invention to provide a system and a method to manage communication between an advertising agency and one or more vendors. Further, the object of the present invention is to provide a system and a method to generate electronic contracts for advertising campaigns. Furthermore, the object of the present invention is to provide a system and a method to facilitate tracking of communication between the advertising agency and the vendors.

These and other advantages will be apparent from the present application of the embodiments described herein. The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The foregoing and other aspects of the embodiments disclosed herein are best understood from the following detailed description when read in connection with the accompanying drawings. For the purpose of illustrating the embodiments disclosed herein, there is shown in the drawings embodiments that are presently preferred, it being understood, however, that the embodiments disclosed herein are not limited to the specific instrumentalities disclosed. Included in the drawings are the following figures:

FIG. 4 illustrates an exemplary user interface of a communication device illustrating available spots on an advertising medium for advertising, according to embodiments disclosed herein.

Figure 1:
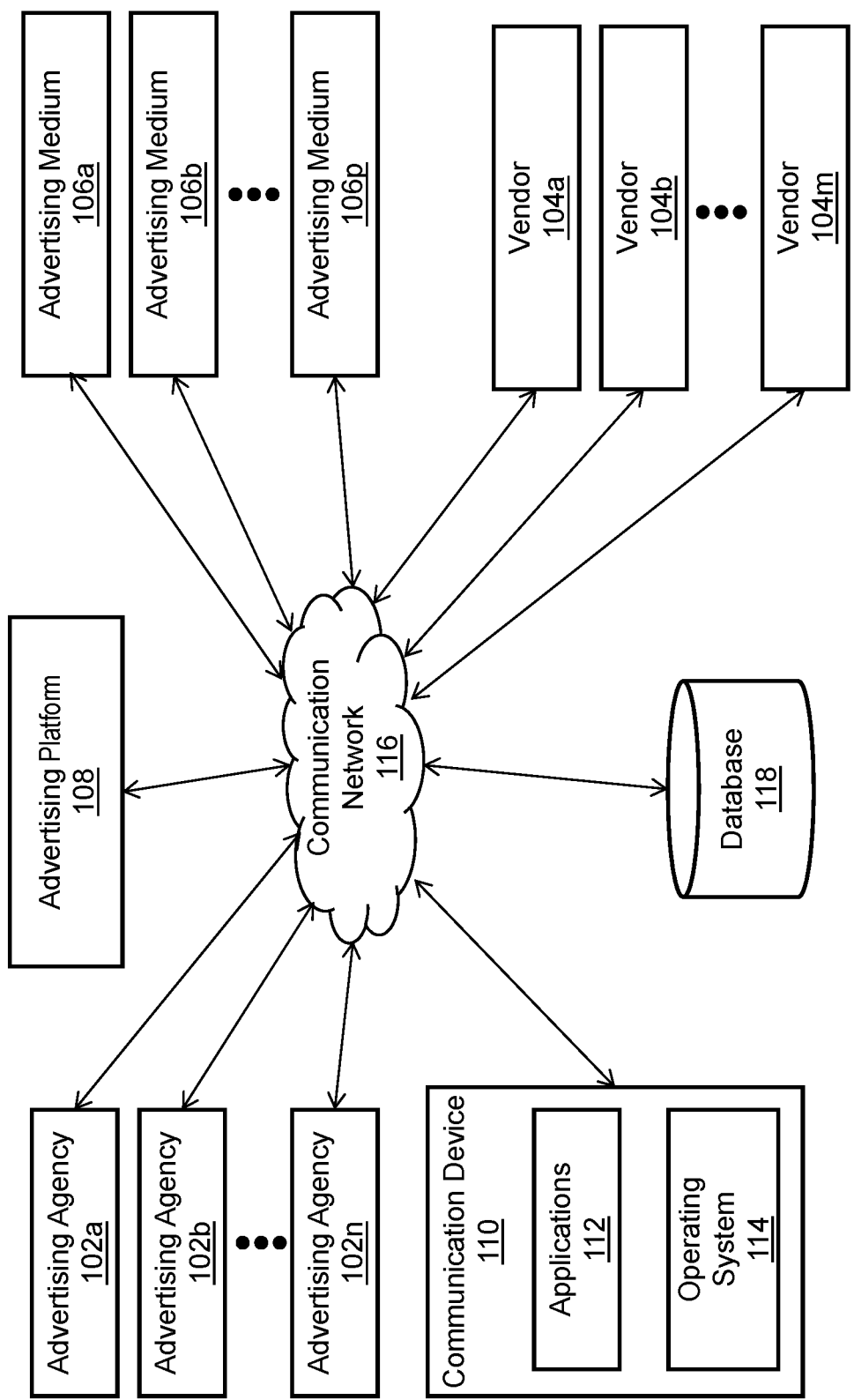
FIG. 1 illustrates various components of a system capable of managing a relationship between an advertising agency and a vendor, according to embodiments disclosed herein.

While embodiments of the present invention are described herein by way of example using several illustrative drawings, those skilled in the art will recognize the present invention is not limited to the embodiments or drawings described. It should be understood the drawings and the detailed description thereto are not intended to limit the present invention to the particular form disclosed, but to the contrary, the present invention is to cover all modification, equivalents and alternatives falling within the spirit and scope of embodiments of the present invention as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention will be described below in conjunction with an exemplary advertising system. Embodiments of the present invention are not limited to any particular type of advertising system. Those skilled in the art will recognize the disclosed techniques may be used in any advertising system in which it is desirable to advertise on any advertising medium.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

FIG. 1 illustrates various components of a system 100 capable of managing a relationship between an advertising agency 102a-102n (hereinafter referred to as the advertising agency 102) and a vendor 104a-104m (hereinafter referred to as the vendor 102), according to embodiments disclosed herein. The advertising agency 102 may require to market a product or a service by advertising on one or more advertising medium 106a-106p (hereinafter referred to as the advertising medium 106). According to embodiments of the present invention, the advertising medium 106 may include, but is not limited to, an aerial billboard, a wall-scape billboard, a digital video billboard, a signage billboard, a phone booth billboard, a mobile billboard, a guerrilla marketing, and so forth, located outdoors or in any indoor location such as, shopping centers, airports, elevators, etc. In embodiments of the present invention, the advertising medium 106 may include, but is not limited to, a digital advertising medium, a static advertising medium, a dynamic digital advertising medium, a printed advertising medium and/or any other type of advertising medium 106 that may be beneficial to display advertisements about products or services to passing potential customers.

In an embodiment of the present invention, the advertising agency 102 may be an owner of the product or the service, who desires to advertise about the products or the services. In another embodiment of the present invention, the advertising agency 102 may be a third party agency handling the marketing of the products or the services for a customer. Further, the vendor 104 may own, sell, operate, or provide on lease one or more available advertising medium 106 to the advertising agency 102. In an embodiment of the present invention, the vendor 104 may provide a package of advertising medium 106 such as, but not limited to, a group of the advertising medium 106 at a single geographic location or a group of the advertising mediums 106 from different geographic locations, and so forth. The vendor 104 may provide the package at a discounted price as an incentive to the advertising agency 102. In an embodiment of the present invention, the vendor 104 may provide the package without the option to buy or rent the advertising medium 106 individually. In another embodiment of the present invention, the vendor 104 may provide the package with an option to buy the advertising medium 106 individually.

Further, the system 100 may comprise an advertising platform 108, in an embodiment of the present invention. The advertising platform 108 may be capable of managing a purchase of slots on the advertising medium 106 for advertising purpose between the advertising agency 102 and the vendor 104. In one embodiment of the present invention, the advertising platform 108 may be a software application running on the communication device 110. Other applications may also be stored as software or a firmware on the communication device 110. In another embodiment of the present invention, the advertising platform 108 may be operated independently by a third-party vendor (not shown).

Figure 2:
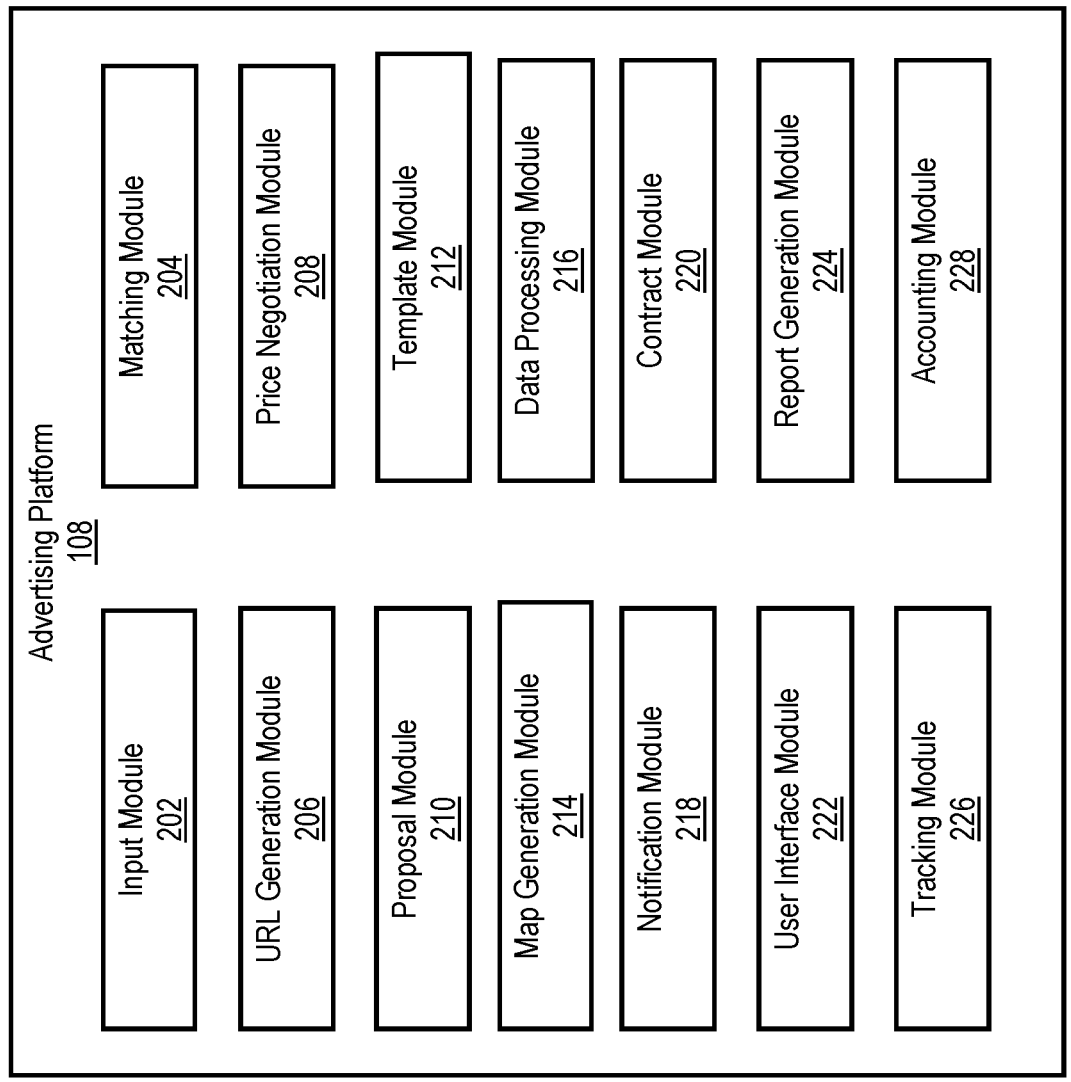
FIG. 2 illustrates an advertising platform of the system, according to embodiments disclosed herein.

The functioning of the advertising platform 108 is explained in detail in conjunction with FIG. 2.

The advertising agency 102 may initialize a Request for Proposal (RFP) by sending the RFP using the advertising platform 108. In an embodiment of the present invention, a Customer Service Representative (CSR) of the advertising platform 108 of the system 100 may use the communication device 110 to enter details of the RFP into the advertising platform 108. In an alternate embodiment of the present invention, the advertising agency 102 may directly communicate with the advertising platform 108 using the communication device 110. The communication device 110 may be, but not limited to, a computer system, a personal computer, a laptop, a workstation, a terminal, a notebook, a net book, a tablet or a tablet like device, a cell phone, a smart phone, a Personal Digital Assistant (PDA), a mobile device, and so forth. The communication device 110 may further include, but not limited to, a plurality of software applications 112, an operating system 114, a memory (not shown), an input-output devices (not shown) for receiving a user input and/or displaying outputs, a system bus (not shown) to connect multiple components mentioned above. The software applications 112 may include, but not limited to, a navigation application, a gaming application, an imaging application, an e-commerce application, and so forth, in an embodiment of the present invention.

In one embodiment of the present invention, the CSR, the advertising agency 102 and the vendor 104 may utilize the communication device 110 to communicate with the advertising platform 108 and with each other through a communication network 116. The communication network 116 may include a data network such as, but not limited to, the Internet, Local Area Network (LAN), Wide Area Network (WAN), Metropolitan Area Network (MAN), etc. In some embodiments of the present invention, the communication network 116 may include a wireless network, such as, but not limited to, a cellular network and may employ various technologies including an Enhanced Data Rates For Global Evolution (EDGE), a General Packet Radio Service (GPRS), a Global System For Mobile Communications (GSM), an Internet Protocol Multimedia Subsystem (IMS), an Universal Mobile Telecommunications System (UMTS) etc. In some embodiments of the present invention, the communication network 116 may include or otherwise cover networks or sub-networks, each of which may include, for example, a wired or a wireless data pathway. The communication network 116 may include a circuit-switched voice network, a packet-switched data network, or any other network capable for carrying electronic communications. For example, the communication network 116 may include networks based on the Internet protocol (IP) or Asynchronous Transfer Mode (ATM), and may support voice usage, for example, VoIP, Voice-over-ATM, or other comparable protocols used for voice data communications. In one implementation, the communication network 116 may include a cellular telephone network configured to enable exchange of a text or a Short Message Service (SMS).

Examples of the communication network 116 may further include, but are not limited to, a Personal Area Network (PAN), a Storage Area Network (SAN), a Home Area Network (HAN), a Campus Area Network (CAN), a Virtual Private Network (VPN), an Enterprise Private Network (EPN), Internet, a Global Area Network (GAN), and so forth. Embodiments are intended to include or otherwise cover any type of network, including known, related art, and/or later developed technologies to connect components of the system 100 such as the communication device 110, the advertising agency 102, the vendor 104, the advertising medium 106, the advertising platform 108, and so forth.

Further, the system 100 may include a database 118 for storage and retrieval of search results based on an inputs received from the communication device 110. In one embodiment of the present invention, the database 118 may be any type of data storage known to a person skilled in the art. The database 118 may store data related to such as, but not limited to, the CSR, the advertising agency 102, the vendor 104, the advertising medium 106, and so forth.

FIG. 2 illustrates the advertising platform 108 of the system 100, according to embodiments of the present invention. The advertising platform 108 may include, but not limited to, an input module 202, a matching module 204, a URL generation module 206, a price negotiation module 208, a proposal module 210, a template module 212, a map generation module 214, a data processing module 216, a notification module 218, a contract module 220, a user interface module 222, a report generation module 224, a tracking module 226, and an accounting module 228. In one embodiment of the present invention, the advertising platform 108 may include more than one input module 202, the matching module 204, the URL generation module 206, the price negotiation module 208, the proposal module 210, the template module 212, the map generation module 214, the data processing module 216, the notification module 218, the contract module 220, the user interface module 222, the report generation module 224, the tracking module 226, and the accounting module 228.

Figure 3:
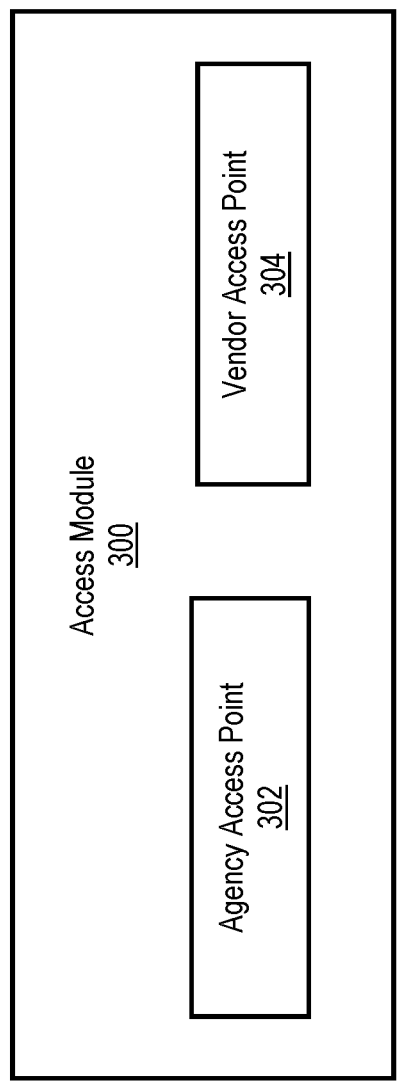
FIG. 3 illustrates an exemplary access module of the advertising platform, according to embodiments disclosed herein.

The input module 202 may be configured to receive inputs from, the advertising agency 102, the vendor 104, and/or the CSR of the system 100. In an embodiment of the present invention, the advertising agency 102 may have to register with the advertising platform 108 before communicating with the vendor 104. The advertising agency 102 may register through an agency access point 302 of an access module 300 (as shown in FIG. 3). In an embodiment of the present invention, the access module 300 may be configured to enable a representative of the advertising agency 102 to access the advertising platform 108 for providing advertising parameters. The advertising agency 102 may register using details such as, but not limited to, a name of the advertising agency 102, contact details, an email ID, an address, a bank account number, and so forth. In an embodiment of the present invention, the advertising agency 102 may be an owner of a product or a service who desires to advertise about products or the services on the advertising mediums 106. In another embodiment of the present invention, the advertising agency 102 may be a third party agency handling marketing of the products or the services on behalf of a customer. After registration, the input module 202 may enable the representative of the advertising agency 102 to create an account with the advertising platform 108 by using an agency identifier (ID) and an agency password that may be used in all future communications with the advertising platform 108, in an embodiment of the present invention. Further, the agency ID and the agency password may include, but is not limited to a number, a character, a special character or a combination thereof.

In another embodiment of the present invention, the vendors 104 may have to register with the advertising platform 108 before communicating with the advertising agency 102. The vendor 104 may have to register through a vendor access point 304 of the access module 300, as discussed above (shown in FIG. 3). The input module 202 may enable the vendor 104 to register with the advertising platform 108 by providing details such as, but not limited to, a name, a contact detail, a location of the advertising mediums 106 associated with the vendor 104, a detailed inventory of the advertising medium 106, a package, a media type, a market, a bank account number, and so forth. After registration, the input module 202 may enable the vendor 104 to create an account with the advertising platform 108 by creating a vendor identifier (ID) and a vendor password that may be used in all future communications with the advertising platform 108. In an embodiment of the present invention, the vendor ID and the vendor password may include, but is not limited to, a number, a character, a special character, or a combination thereof.

Further, the input module 202 may communicate with the template module 212 to generate a one-sheet for each of the advertising mediums 106 associated with the vendor 104. In an embodiment of the present invention, every time a detail of the advertising medium 106 associated with the vendor 104 is edited and/or updated, a new one-sheet may be generated by the template module 212.

Further, the input module 202 may be configured to receive one or more request for proposal (RFP) from the advertising agency 102. The RFP may include parameters such as, but not limited to, a media type, a market, an advertising agency location, an advertising area, an advertisement start date, an advertisement end date, a time, and so forth. According to an embodiment of the present invention, the RFP entered by the advertising agency 102 using the input module 202, may be transmitted to the system 100 directly through the communication network 116. In an alternate embodiment of the present invention, the RFP from the advertising agency 102 may be shared by, for example, but not limited to, an email, with the CSR. Further, the input module 202 may enable the CSR may to enter the details associated with the RFP into the advertising platform 108. The input module 202 may be configured to store the received RFP associated with the advertising agency 102 in a database such as, the database 118. In an embodiment of the present invention, the input module 202 may assign a unique identifier (ID) to each of the received RFPs for each of the advertising agency 102. The unique ID may be utilized to identify and differentiate between a plurality of RFPs associated with a plurality of the advertising agency 102 stored in the database 118.

The matching module 204 may be configured to match the parameters of the RFP with vendor details associated with the vendors 104. In an embodiment of the present invention, the vendor details associated with the vendors 104 may be stored in the database 118. Further, the matching module 204 may be configured to select a list of vendors 104 having matching inventory with the received RFP of the advertising agency 102.

Further, the URL generation module 206 may be configured to generate a distinctive, unique and/or complex Uniform Resource Locator (URL) associated with each of the unique ID assigned to the RFP stored in the database 118. The URL may include, but not limited to, a combination of letters, numbers, special characters, and so forth. In an exemplary scenario, the URL generated for a RFP associated with the advertising agency 102 is 9169a5fe3e32dffdf3cba01f4da5e039. In an embodiment of the present invention, the generated URL may include, but not limited to, an expiration date and/or time for the vendor 104 to respond to the received RFP. The generated URL may then be transmitted to the notification module 218. Further, the matching module 204 and the URL generation module 206 may communicate with the notification module 218 to create a RFP notification for the vendors 104.

The notification module 218 may be configured to create the RFP notification that may include, but not limited to, the received RFP and the generated URL. In an embodiment of the present invention, the RFP notification may be, but not limited to an email, a text message, a short message service (SMS), a social network message, and so forth. Embodiments of the present invention are intended to include or otherwise cover any type of RFP notification including known or later developed technologies that may be beneficial to provide a notification to the vendor 104. Furthermore, the notification module 218 may transmit the RFP notification along with the generated URL to the selected vendors 104, in an embodiment of the present invention. In another embodiment of the present invention, the notification module 218 may share the RFP notification with a vendor 104 that may have not registered with the advertising platform 108. The database 118 may store data associated with the non-registered vendor 104. In another embodiment of the present invention, the data associated with the registered and non-registered vendor 104 may be stored and/or updated in the database 118 by a third-party service provider.

Further, the URL generation module 206 may be configured to redirect the vendor 104 to the vendor access point 304 (as shown in FIG. 3), when the vendor 104 clicks on the generated URL. The vendor 104 may be prompted to enter the vendor ID and the vendor password for verification. In an embodiment of the present invention, the matching module 204 may verify the vendor ID and the vendor password with the details of the vendor 104 stored in the database 118. If the matching module 204 determines that the vendor 104 registration is already complete then the matching module 204 may redirect the vendor 104 to a webpage linked to the URL. The vendor 104 may then access the linked webpage that comprises a profile of the vendor 104 having options such as, but not limited to, add an advertising medium 106, edit an advertising medium 106, update a pricing of the advertising medium 106, delete an advertising medium 106, respond to the RFP, check a status of the RFP, respond to a hold request, sign an electronic contract, view an electronic contract, upload a POP images, and so forth.

Furthermore, if the matching module 204 determines that the vendor 104 has not been registered, then the vendor 104 may be redirected to a webpage to complete the pending registration and to create a vendor ID and a vendor password that may be used in all future communications with the advertising platform 108. On the successful registration, the matching module 204 may redirect the vendor 104 to the linked webpage that comprises the profile of the vendor 104 having options such as, but not limited to, add an advertising medium, edit an advertising medium, update a pricing of the advertising medium, delete an advertising medium, respond to the RFP (provide details of an available advertising medium, update a pricing of the available advertising medium), check a status of the RFP, respond to a hold request, sign an electronic contract, view an electronic contract, upload a POP image, and so forth.

The URL generation module 206 may be configured to enable the vendor 104 to add newly purchased advertising medium 106 that matches with the parameters of the RFP of the advertising agency 102. In an embodiment of the present invention, the details of the newly purchased advertising medium 106 of the vendor 104 may be updated in the database 118 through a third party service provider.

Further, when the vendor 104 completes the details of the advertising mediums 106, the notification module 218 may then be configured to transmit a notification to the CSR that the details has been completed and a response for the RFP is received from the vendor 104. In an embodiment of the present invention, the notification may be sent as, but not limited to, a Short Messaging Service (SMS), an email, a voice based message, and so forth. Further, the URL generation module 206 may be configured to generate unique/complex URL comprising the unique ID associated with the RFP. Furthermore, the notification module 218 may further be configured to send a notification to the advertising agency 102 about the received response from the vendor 104.

When the generated URL is clicked by the advertising agency 102, the URL generation module 206 may redirect the advertising agency 102 to the agency access point 302 (as shown in FIG. 3). The advertising agency 102 may be prompted to enter the agency ID and the agency password in order to check the response from the vendor 104. In an embodiment of the present invention, the matching module 204 may match the agency ID and the agency password with the details of the advertising agency 102 stored in the database 118. Once the successful login, the advertising agency 102 may then access the linked webpage that comprises the response from the vendor 104 comprising prices offered by each of the matching vendors 104. The advertising agency 102 may accept the prices entered by the matching vendors 104 or may negotiate the price using the price negotiation module 208.

The price negotiation module 208 may be configured to act as an intermediate interface for the advertising agency 102 and the vendor 104 for negotiating the prices received from the vendors 104. In an embodiment of the present invention, the CSR may initiate a price negotiation with the vendor 104 and/or the advertising agency 102. In another embodiment of the present invention, the price negotiation module 208 may be configured to enable the CSR to update pricing of the advertising medium 106 with the vendor 104 and set a price to deliver to the advertising agency 102.

Further, the proposal module 210 may be configured to generate a proposal for the advertising agency 102. In one embodiment of the present invention, the proposal may include, but not limited to, a pricing of the advertising medium 106, a template of an advertisement, a market map, an interactive map, a charting, and so forth.

Further, the template module 212 may comprise a predefined template for each media type, such as, but not limited to, a print media, a digital media, and so forth, in an embodiment of the present invention. The template module 212 may be configured to enable the CSR to select a predefined template capable of electronic data exchange, provided by the advertising agency 102. The template may take the form of a spreadsheet file (e.g., an Excel® or Excel-compatible file), an HTML or a XML file, or substantially any file format and/or user interface intended for human-to-machine data entry.

The template module 212 may enable the CSR to enter details of the proposal in the selected template, in an embodiment of the present invention. The template may provide a particular advantage of ease of data entry and reduction in errors (e.g., through labeling, real-time error checking, and the like) so that the CSR does not need extensive training in data entry and creating a proposal. The template module 212 may further be configured to create a one-sheet for each of the advertising mediums 106 associated with the vendor 104, in an embodiment of the present invention. In another embodiment of the present invention, the template module 212 may be configured to provide a template to the CSR with a drag-and-drop option in order to reorder a sequence of columns and/or rows (e.g., to emphasize data, to group similar data, etc.).

Further, the map generation module 214 may be configured to generate the market map that indicates a location of each advertising medium 106 mentioned in the proposal. Further, the map generation 214 module may be further configured to merge all the one-sheets of the advertising mediums 106, as discussed above, included in the proposal into a single one-sheet and the merged single one-sheet may then be delivered to the advertising agency 102, in an embodiment of the present invention.

Further, the notification module 218 may be configured to create a proposal notification comprising the proposal generated by the proposal module 210. In an embodiment of the present invention, the proposal notification may be, but not limited to an email, a text message, a Short Message Service (SMS), a social network message and so forth. In an embodiment of the present invention, the URL generation module 206 may generate a unique/complex URL comprising the unique ID associated with the RFP for the proposal notification. The URL may be, but not limited to, a combination of a letter, a number, a special character, and so forth. In an exemplary scenario, the URL may be 9169a5fe3e32ffddf3abc01f4da5e903. The notification module 218 may further be configured to transmit the URL to the advertising agency 102 along with the proposal notification.

Further, the URL generation module 206 may be configured to redirect the advertising agency 102 to the agency access point 302 (as shown in FIG. 3) when the URL is clicked by the advertising agency 102. The advertising agency 102 may again be prompted to enter the agency ID and the agency password. In an embodiment of the present invention, the matching module 204 may match the agency ID and the agency password with the details of the advertising agency 102 stored in the database 118. The advertising agency 102 may then access the linked webpage to the generated URL that comprises the proposal.

Further, the map generation module 214 may be configured to create an interactive map that may allow the advertising agency 102 to review advertising medium's 106 locations as compared to the locations of the advertising agency 102 or the customer. In one embodiment of the present invention, the interactive map may show advertising medium 106 by market with options to show an advertising agency location, a customer location and/or a competitor location. Further, the map generation module 214 may be configured to overlay demographic data by a zip code on the interactive map, in an embodiment of the present invention. The map generation module 214 may assign a transparent colored overlay to each of the zip code, in an exemplary scenario. The transparent colored overlay may be darker based on a higher population density of the selected demographic, or vice versa. The available demographics may further be divided based on, but not limited to, an age, a sex, an ethnicity, and a household income, and so forth.

The user interface module 222 may enable the advertising agency 102 to interact with the interactive map and may filter the advertising medium 106 based on, but not limited to, a media type, a market, and so forth within the interactive map.

In an embodiment of the present invention, the URL generation module 206 may generate a unique/complex URL comprising the unique ID associated with the RFP for the interactive map. In one embodiment of the present invention, the URL for the interactive map may be transmitted along with the proposal notification to the advertising agency 102 by the notification module 218.

The user interface module 222 may enable the advertising agency 102 to select the advertising medium 106 from the proposal and the interactive map. Further, based on the selection of the advertising medium 106, the notification module 218 may be configured to create a hold request notification for the CSR and/or the vendor 104, which comprises a time period for which the hold for the selected advertising medium 106 should be executed. In an embodiment of the present invention, the hold request notification may be, but not limited to an email, a text message, a short message service (SMS), a social network message and so forth. In an embodiment of the present invention, the CSR may enter the details of the hold request into the advertising platform 108 and the notification module 218 may generate a hold notification for the vendor 104, which comprises a time period and a location of the advertising medium 106 for which the hold should be executed. Further, the hold request notification may comprise a unique/complex URL comprising the unique ID associated with the RFP generated by the URL generation module 206. The URL, when clicked by the vendor 104, may redirect the vendor 104 to the vendor access point 304 (as shown in FIG. 3). The vendor 104 may be prompted to enter the vendor ID and the vendor password. The vendor 104 may then access the linked webpage to the URL that comprises a profile of the vendor 104 having options such as, but not limited to, check a status of the RFP, respond to a hold request, sign an electronic contract, view an electronic contract, upload a POP images and so forth. In an alternate embodiment of the present invention, the CSR may utilize the notification module 218 and put the advertising medium 106 on hold automatically according to the request received from the advertising agency 102.

Further, the contract module 220 may be configured to generate an agency contract based on the advertising medium 106 selected by the advertising agency 102 from the proposal. In one embodiment of the present invention, the contract module 220 may generate an electronic agency contract (e-agency contract) associated with each of the selected advertising mediums 106.

Further, once the e-agency contract is generated, the notification module 218 may be configured to create an agency contract notification, in an embodiment of the present invention. Further, the agency contract notification may comprise a unique/complex URL comprising the unique ID associated with the RFP, which is generated by the URL generation module 206. The notification module 218 may transmit the agency contract notification to the advertising agency 102. The advertising agency 102 may electronically sign the agency contract through the user interface module 222 and the notification module 218 may then generate a notification for the CSR to confirm that the agency contract is signed by the advertising agency 102. In another embodiment of the present invention, the user interface module 222 may enable the CSR to electronically sign the agency contract on the behalf of the advertising agency 102.

Further, the contract module 220 may be configured to generate a vendor contract for the vendor 104. In an embodiment of the present invention, the contract module 220 may generate separate vendor contract for each of the vendor 104 whose advertising mediums 106 are selected by the advertising agency 102 from the proposal. In an embodiment of the present invention, the vendor contract may comprise a copy of the agency contract having details such as, but not limited to, a location of the advertising mediums 106, date of advertisement, a time of advertisement, a duration of the advertisement, and so forth.

Further, the notification module 218 may be configured to generate a vendor contract notification, in an embodiment of the present invention. Furthermore, the URL generation module 206 may generate a unique/complex URL comprising the unique ID associated with the RFP and the vendor contract. The vendor contract notification and the URL may be transmitted to the vendor 104 by the notification module 218 as, but not limited to, a Short Messaging Service (SMS), an email, a voice based message, and so forth. Further, the URL, when clicked by the vendor 104, may redirect the vendor 104 to the vendor access point 304 (as shown in FIG. 3).

The vendor 104 may be prompted to enter the vendor ID and the vendor password that is verified by the matching module 204 by matching the vendor ID and vendor password with vendor credentials stored in the database 116. The vendor 104 may then access the linked webpage to the URL that comprises a profile of the vendor 104 having options such as, but not limited to, respond to a hold request, sign an electronic contract, view an electronic contract, upload a POP images and so forth. In an alternate embodiment of the present invention, the vendor contract may be generated by an Application Program Interface (API) with a third party.

Further, the data processing module 216 may be configured to convert the proposal into a campaign, in an embodiment of the present invention. The campaign may include generating a playlist of the advertisements, in case the advertisement is a digital advertisement. The data processing module 216 may be configured to schedule the generated playlist on the advertising medium 106 in the campaign. The data processing module 216 may transmit the playlist to a media player running on different advertising medium 106 in order to display the digital advertisement on the advertising medium 106. In one embodiment of the present invention, the playlist may be generated and transmitted to the media player through a third party service provider. In another embodiment of the present invention, in case of a print media type, the data processing module 216 may transmit the content of the advertisement to the vendor 104 for printing and displaying the advertisement on the advertising medium 106.

Figure 4:
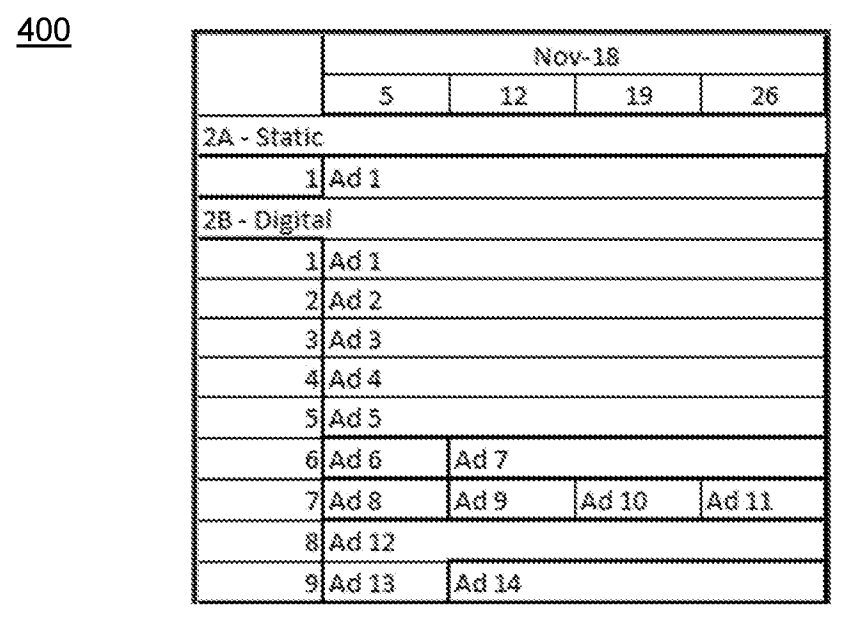

In an embodiment of the present invention, the user interface module 222 may be configured to present a dashboard to the advertising agency 102 and/or the vendor 104 to review the proposals and the playlists that are currently being advertised as explained in conjunction with FIG. 4.

FIG. 4 illustrates an exemplary user interface 400 of a communication device 110 illustrating available spots on an advertising medium 106 for advertising. A static advertising medium may display a single advertisement 'Ad 1' from Nov. 5, 2018 to Nov. 26, 2018 on a single slot 1, whereas the digital advertising medium may display multiple advertisements on different days at different slots 1, 2, 3, 4, 5, 6, 7, 8, and 9. As shown in the FIG. 4, an advertisement 'Ad 2' may be displayed from Nov. 5, 2018 to Nov. 26, 2018 while an advertisement 'Ad 6' is scheduled to be displayed on Nov. 5, 2018 and then an advertisement 'Ad 7' is scheduled to be displayed from Nov. 12, 2018 to Nov. 26, 2018.

Furthermore, the data processing module 216 may be configured to communicate a status of the campaign to the notification module 218. Once the campaign is live, the notification module 218 may generate a Proof Of Performance (POP) notification. The POP notification may further comprise a unique/complex URL comprising the unique ID associated with the RFP of the advertising agency 102 generated by the URL generation module 206. The notification module 218 may transmit the POP notification comprising the URL to the vendor 104.

The URL generation module 206 may redirect the vendor 104 to the vendor access point 304 (as shown in FIG. 3), when the vendor 104 clicks on the generated URL. The vendor 104 may be prompted to enter the vendor ID and the vendor password. On successful log in, the vendor 104 may access the linked webpage to the generated URL that comprises the profile of the vendor 104 having options such as, but not limited to, upload a POP images, and so forth. In an embodiment of the present invention, the POP notification may be sent as, but not limited to, a short messaging service (SMS), an email, a voice based message, and so forth.

The POP notification may then prompt the vendor 104 to upload the POP images for each advertising medium 106, and for each flight i.e., days that the advertisement is running, and for each creative, i.e., an advertising artwork being displayed. Further, the POP images may include, but are not limited to, a photograph and/or a video of an advertisement displayed on an advertising medium 106 selected by the advertising agency 102. In one embodiment of the present invention, the POP images may be captured by a third party system.

Once all the POP images are captured for the campaign, the report generation module 224 may be configured to generate a POP report. In one embodiment of the present invention, the POP report may include, but is not limited to, the POP images of each advertising medium 106 at each location displaying the advertisement in the campaign.

Further, the notification module 218 may generate a POP report notification for the generated POP report, in an embodiment of the present invention. The POP report notification may further comprise a unique/complex URL comprising the unique ID associated with the RFP generated by the URL generation module 206. The notification module 218 may transmit the POP report notification comprising the URL to the advertising agency 102. The URL, when clicked by the advertising agency 102, may redirect the advertising agency 102 to the agency access point 302 (as shown in FIG. 3). The advertising agency 102 may be prompted to enter the agency ID and the agency password. The advertising agency 102 may then access the linked webpage to the URL that comprises the generated POP report.

Further, the tracking module 226 may be configured to track each notification such as, but not limited to an email, a SMS, a text message, and so forth between the advertising agency 102 and the vendor 104. In one embodiment of the present invention, the tracking module 226 may be configured to modify each notification by embedding a tracking image in the notification. When the notification is read by the recipient (e.g., advertising agency 102 or vendor 104) and the tracking image is loaded, the notification module 218 may transmit a tracking notification to a sender of the email (e.g., advertising agency 102 or vendor 104) that the notification has been read by the receiver.

The accounting module 228 may be configured to manage exchange of funds between the advertising agency 102 and the vendor 104 for the advertisement that is being displayed on the advertising medium 106. In some embodiments of the present invention, the accounting module 228 may be controlled by a third party service provider. The accounting module 228 may receive information regarding the agency contract associated with advertising agency 102, and the vendor contract associated with the vendor 104, for displaying advertisements on the advertising mediums 106.

Further, the accounting module 228 may be configured to generate a contract invoice for the advertising agency 102 to pay for the advertisement campaigns, in an embodiment of the present invention. In another embodiment of the present invention, the accounting module 228 may be configured to generate a contract invoice for the vendor 104. In an embodiment of the present invention, the advertising agency 102 may be charged according to the terms of the agency contract generated by the contract module 220. Further, the notification module 218 may be configured to generate an invoice notification comprising a unique/complex URL comprising the unique ID of the RFP of the advertising agency 102, generated by the URL generation module 206, which is transmitted to the advertising agency 102.

Figure 5:
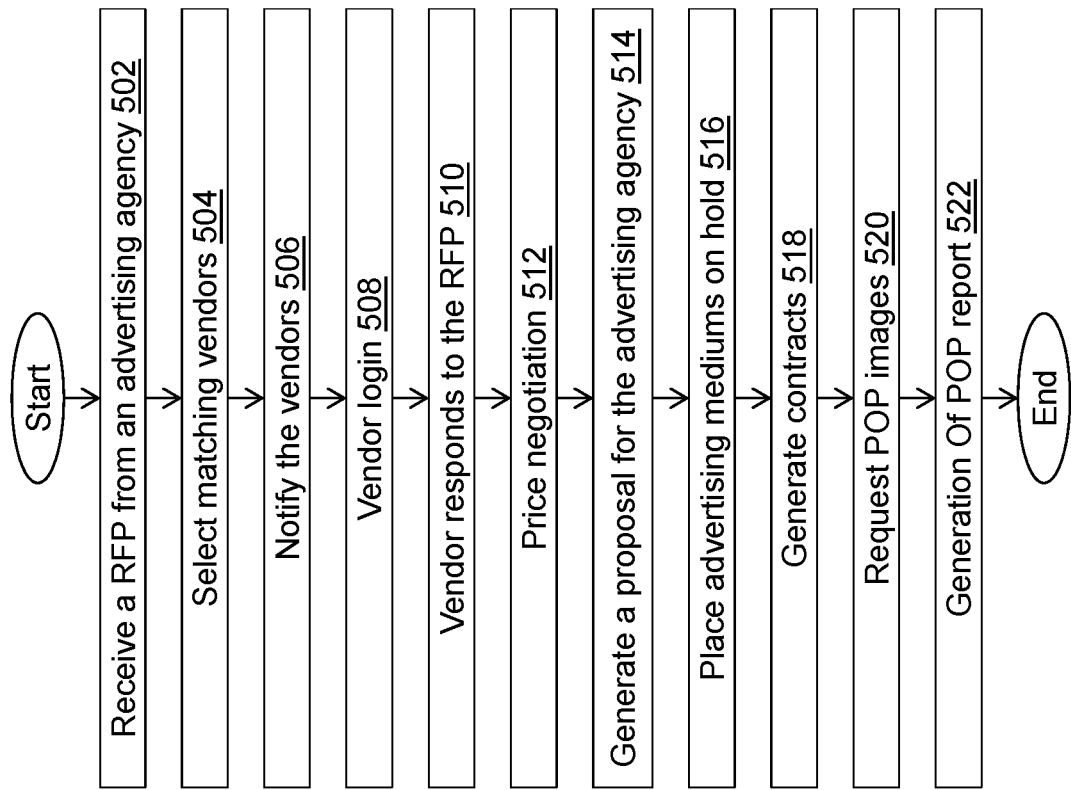
FIG. 5 illustrates a flowchart of a process for selecting an advertising medium and advertising on the selected advertising medium, according to embodiments disclosed herein.

FIG. 5 illustrates a flowchart of a process 500 for selecting an advertising medium 106 and advertising on the selected advertising medium 106, according to embodiments disclosed herein.

At step 502, the advertising platform 108 may receive one or more request for proposal (RFP) from the advertising agency 102, in an embodiment of the present invention. The RFP may include parameters such as, but not limited to, a media type (e.g., digital, print, etc.), a market, advertising agency locations, advertising areas, an advertising start date, an advertising end date, and a time, and so forth.

Further, at step 504, the advertising platform 108 may match the parameters with details associated with one or more vendors 104 and may selects a list of vendors 104 having matching inventory with the received RFP of the advertising agency 102.

At step 506, the advertising platform 108 may generate a RFP notification comprising a unique/complex Uniform Resource Locator (URL). The URL may comprise a unique identifier (ID) associated with the RFP of the advertising agency 102. The RFP notification may be generated for each of the selected vendors 104. The URL may be associated with a linked webpage that comprises a profile of the vendor 104. The RFP notification along with the generated URL may be shared, for example, through an email, with each of the selected vendor 104 over the communication network 116.

Next, at step 508, the vendor 104 may access the advertising platform 108 through the received URL embedded in the RFP notification. Upon successful login, the profile of the vendor 104 is displayed, which may have options such as, but not limited to, add an advertising medium 106, edit an advertising medium 106, delete an advertising medium 106, respond to RFP, check a status of RFP, respond to hold requests, sign a contract, view a contract, upload POP images and so forth. At step 510, the vendor 104 may respond to the received RFP.

At step 512, the advertising platform 108 may enable the vendor 104 and the advertising agency 102 to negotiate a price for the advertising mediums 106 on which the advertisement is to be displayed. In another embodiment of the present invention, the advertising platform 108 may enable the CSR to update the pricing of the selected advertising mediums 106 with the vendor 104 and set a price to deliver to the advertising agency 102.

At step 514, the advertising platform 108 may generate a proposal and send it to the advertising agency 102. The proposal may include, but not limited to, a pricing of the advertising medium 106, a merged one-sheet for each of the selected advertising medium 106, a market map, an interactive map, a charting, and so forth. In an embodiment of the present invention, the advertising platform 102 may transmit the proposal along with a unique/complex URL comprising the unique ID associated with the RFP of the advertising agency 102.

At step 516, the advertising platform 108 may transmit a hold request notification to each vendor 104 whose advertising medium 106 have been selected by the advertising agency 102 as per the proposal to put a hold on the selected advertising medium 106 at a specific location for a specific period of time. The vendor 104 may receive the hold request notification through, but not limited to, an email, and so forth. The hold request notification may comprise a unique/complex URL comprising the unique ID associated with the RFP of the advertising agency 102 generated by the advertising platform 108. The vendor 104 may login through the URL and confirm the hold request.

At step 518, the advertising platform 108 may generate a contract based on the advertising medium 106 selected by the advertising agency 102 from the proposal. In one embodiment of the present invention, an electronic contract may be generated for the advertising agency 102, and/or each of the vendor 104, whose advertising medium 106 are selected by the advertising agency 102. The electronic contract may be electronically signed by the advertising agency 102 and/or CSR (on the behalf of the advertising agency 102), and each of the vendor 104 may be notified to countersign the electronic contract. A mutually signed and executed copy of the contract is shared, for example by, but not limited to, an email, and so forth, with the advertising agency 102 and each of the vendor 104.

At step 520, the advertising platform 108 may transmit a POP notification to the vendor 104 for the POP images. The vendor 104 may receive the POP notification through, but not limited to, an email, and so forth. The POP notification may comprise a unique/complex URL comprising the unique ID associated with the RFP of the advertising agency 102 generated by the advertising platform 108. The vendor 104 may login through the URL and may be prompted to upload POP images. The vendor 104 may upload the POP images such as, but not limited to, a POP image for each campaign, for each flight, for each creative per flight, and for a plurality of advertising mediums 106 per flight and/or creative, and so forth.

At step 522, the advertising platform 108 may generate a POP report using the POP images uploaded by the vendor 104 for each of the selected advertising mediums 106. In one embodiment of the present invention, the POP report may include, but not limited to, the POP images of each advertising medium 106 from each location displaying the content of the advertising campaign.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

The exemplary embodiments of this present invention have been described in relation to advertising systems. However, to avoid unnecessarily obscuring the present invention, the preceding description omits a number of known systems and methods. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

A number of variations and modifications of the present invention can be used. It would be possible to provide for some features of the present invention without providing others.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing systems and methods in the absence of modules not depicted and/or described herein or in various embodiments, configurations, or aspects hereof, including in the absence of such modules as may have been used in previous systems or methods, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
   one or more communication devices;
   one or more advertising mediums for displaying at least one advertisement;
   one or more vendors of the one or more advertising mediums;
   at least one advertising agency; and
   a computer-readable medium coupled to the one or more communication devices having instructions stored thereon which, when executed by the one or more communication devices, cause the one or more communication devices to perform operations comprising;
   receiving at least one request for proposal (RFP) from the at least one advertising agency;
   determining one or more advertising mediums that matches with the at least one request for proposal;
   transmitting at least one RFP notification to the one or more vendors of the one or more determined advertising mediums, wherein each of the one or more vendors receives a distinctive Uniform Resource Locator (URL) within the at least one RFP notification;
   receiving at least one response from at least one of the vendors, wherein the at least one advertising agency accepts prices entered from the one or more the vendors and/or the advertising agency negotiates the prices entered with the one or more vendors;
   generating at least one proposal based on the at least one response received from at least one of the vendors, wherein the at least one generated proposal is transmitted to the at least one advertising agency;
   receiving at least one selection of the at least one advertising medium from the at least one advertising agency, wherein the at least one selected advertising medium is put on hold for a specific period of time; and
   generating at least one contract for advertising on the at least one of the selected advertising medium.

2. The system of claim 1, further comprising capturing one or more Proof of Performance (POP) images by using one of the one or more communication devices, imaging devices, or a combination thereof.

3. The system of claim 2, further comprising transmitting at least one POP notification to the at least one vendor for providing one or more Proof of Performance (POP) images.

4. The system of claim 2, further comprising generating at least one report, wherein the report comprising the one or more Proof of Performance (POP) images.

5. The system of claim 4, further comprising transmitting the at least one generated report to the at least one advertising agency.

6. The system of claim 1, wherein the at least one RFP notification is one of a short messaging service (SMS), an email, a voice based message, or a combination thereof.

7. The system of claim 1, wherein the at least one POP notification is one of a short messaging service (SMS), an email, a voice based message, or a combination thereof.

8. The system of claim 1, further comprising tracking the at least one notification by determining if a tracking image embedded within the at least one of the POP and RFP notification is downloaded in the at least one of the communication device.

9. The system of claim 1, wherein the at least one proposal comprises a pricing, a template, a market map, an interactive map, a charting, or a combination thereof.

10. The system of claim 1, wherein the at least one request for proposal comprises at least one of a media type, a market, an advertising agency location, an advertising area, an advertisement start date, an advertisement end date, a time, a package, or a combination thereof.

11. A system comprising:
   one or more communication devices;
   one or more advertising mediums for displaying at least one advertisement;
   one or more vendors of the one or more advertising medium;
   at least one advertising agency; and
   a computer-readable medium coupled to the one or more communication devices having instructions stored thereon which, when executed by the one or more communication devices, cause the one or more communication devices to perform operations comprising;

receiving at least one request for proposal (RFP) from the at least one advertising agency;

determining one or more advertising mediums that matches with the at least one request for proposal;

transmitting at least one RFP notification to the one or more vendors of the one or more determined advertising mediums, wherein each of the one or more vendors receives a distinctive Uniform Resource Locator (URL) within the at least one RFP notification, wherein the at least one RFP notification is tracked by determining if a tracking image embedded within the at least one RFP notification is downloaded in the at least one of the communication device;

receiving at least one response from at least one of the vendors, wherein the at least one advertising agency accepts prices entered from the one or more the vendors and/or the advertising agency negotiates the prices entered with the one or more vendors;

generating at least one proposal based on the at least one response received from at least one of the vendors, wherein the at least one generated proposal is transmitted to the at least one advertising agency;

receiving at least one selection of the at least one advertising medium from the at least one advertising agency, wherein the at least one selected advertising medium is put on hold for a specific period of time; and generating at least one contract for advertising on the at least one of the selected advertising medium.

12. The system of claim 11, further comprising capturing one or more Proof of Performance (POP) images by using one of the one or more communication devices, imaging devices, or a combination thereof.

13. The system of claim 11, further comprising transmitting at least one POP notification to the at least one vendor for providing one or more Proof of Performance (POP) images.

14. The system of claim 11, further comprising generating at least one report, wherein the report comprising the one or more Proof of Performance (POP) images.

15. The system of claim 13, further comprising transmitting the at least one generated report to the at least one advertising agency.

16. The system of claim 11, wherein the at least one RFP notification is one of a short messaging service (SMS), an email, a voice based message, or a combination thereof.

17. The system of claim 11, wherein the at least one POP notification is one of a short messaging service (SMS), an email, a voice based message, or a combination thereof.

18. The system of claim 11, wherein the at least one proposal comprises a pricing, a template, a market map, an interactive map, a charting, or a combination thereof.

19. The system of claim 11, wherein the at least one request for proposal comprises at least one of a media type, a market, an advertising agency location, an advertising area, an advertisement start date, an advertisement end date, a time, a package, or a combination thereof.

20. A computer implemented method by at least one communication device, such that the at least one communication device comprises at least one processor and at least one memory having at least one instruction executable by the at least one processor, the method comprising steps of;

receiving at least one request for proposal from at least one advertising agency;

determining one or more advertising mediums that matches with the at least one request for proposal;

transmitting at least one RFP notification to one or more vendors of the one or more determined advertising mediums, wherein each of the one or more vendors receives a distinctive Uniform Resource Locator (URL) within the at least one RFP notification, wherein the at least one RFP notification is tracked by determining if a tracking image embedded within the at least one RFP notification is downloaded in the at least one of the communication device;

receiving at least one response from at least one of the vendors, wherein the at least one advertising agency accepts prices entered from the one or more the vendors and/or the advertising agency negotiates the prices entered with the one or more vendors;

generating at least one proposal based on the at least one response received from at least one of the vendors, wherein the at least one generated proposal is transmitted to the at least one advertising agency;

receiving at least one selection of the at least one advertising medium from the at least one advertising agency, wherein the at least one selected advertising medium is put on hold for a specific period of time; and generating at least one contract for advertising on the at least one of the selected advertising medium.

21. The method of claim 20, further comprising capturing one or more Proof of Performance (POP) images by using one of the one or more communication devices, imaging devices, or a combination thereof.

22. The method of claim 20, further comprising transmitting at least one POP notification to the at least one vendor for providing one or more Proof of Performance (POP) images.

23. The method of claim 20, further comprising generating at least one report, wherein the report comprising the one or more Proof of Performance (POP) images.

* * * * *